United States Patent [19]

Deligny

[11] Patent Number: 4,464,950
[45] Date of Patent: Aug. 14, 1984

[54] MECHANICAL CONTROL BY CABLE SLIDING AXIALLY IN A FLEXIBLE SHEATH

[75] Inventor: Jean Deligny, Le Mans, France

[73] Assignee: Societe Anonyme D.B.A., Paris, France

[21] Appl. No.: 325,603

[22] Filed: Nov. 30, 1981

[30] Foreign Application Priority Data

Dec. 11, 1980 [FR] France .................. 80 26284

[51] Int. Cl.³ .............................................. F16C 1/10
[52] U.S. Cl. ............................................ 74/501.5 R
[58] Field of Search ........... 74/501 R, 501.5 R, 501 P

[56] References Cited

U.S. PATENT DOCUMENTS

| 2,957,354 | 10/1960 | Morrow | 74/501.5 X |
| 3,587,341 | 6/1971 | Fiddler | 74/501 R |
| 3,605,520 | 9/1971 | Lorentz et al. | 74/501.5 X |

FOREIGN PATENT DOCUMENTS

| 0030494 | 6/1981 | European Pat. Off. |
| 449157 | 2/1913 | France. |
| 2375489 | 7/1978 | France. |

Primary Examiner—Leslie A. Braun
Assistant Examiner—Frank McKenzie

Attorney, Agent, or Firm—Paul D. Schoenle; Ken C. Decker

[57] ABSTRACT

The invention relates to a mechanical control by cable (10) sliding axially in a flexible sheath (12), equipped with an automatic adjustment device (40) for varying the length of the sheath as a function of the clearances appearing in the control, and of which one end (28) is connected to a receiving member (30) provided with elastic return means (36).

According to the invention, the adjustment device (40) includes two telescopic sheath extensions (43,44) inserted between two consecutive portions (41,42) of the sheath to which they are fixed, a wedge-action locking member (62) disposed between the two sheath extensions (43,44) to interlock the latter by wedging during actuation of the mechanical control, and a control member (80) fixed to the locking member (62) and connected to the cable (10) by means of a friction connection (84,11), the control member (80) being entrained, during actuation of the control, in axial translation by the cable (10) in the direction corresponding to wedging of the locking member until the sheath extensions (43,44) are interlocked, the control member being entrained in axial translation by the cable in the direction corresponding to unlocking when the return force applied to the cable becomes less than a predetermined value.

14 Claims, 5 Drawing Figures

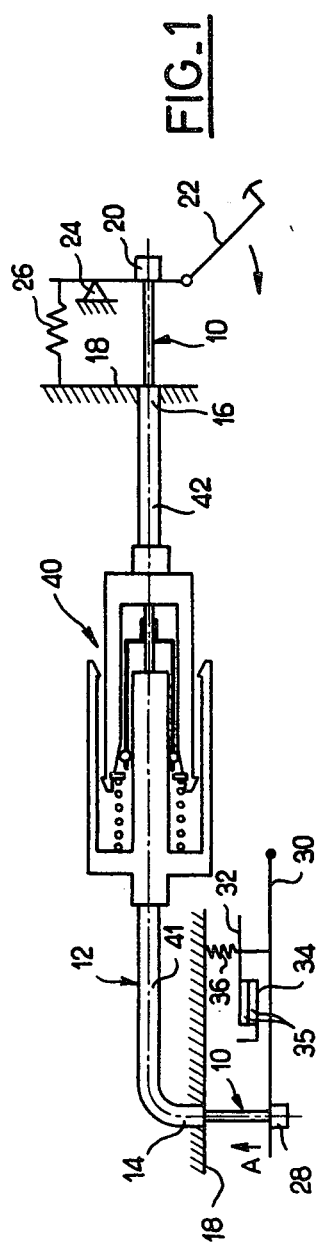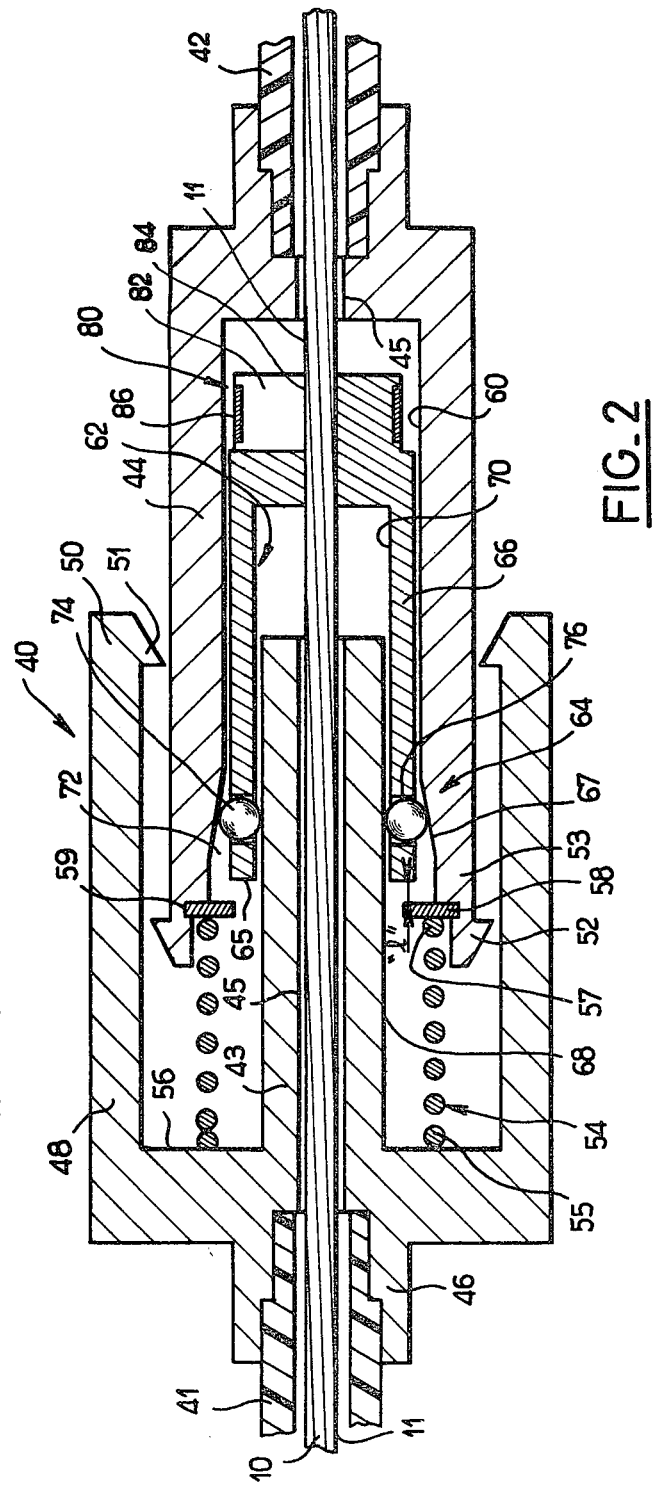

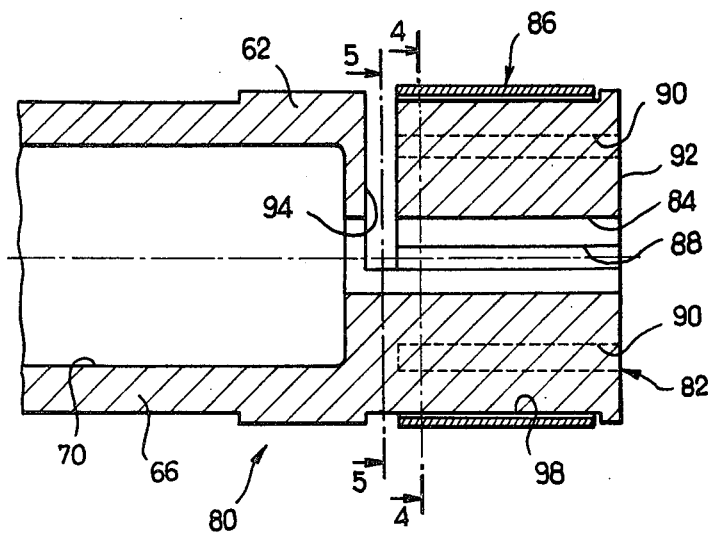
FIG_3
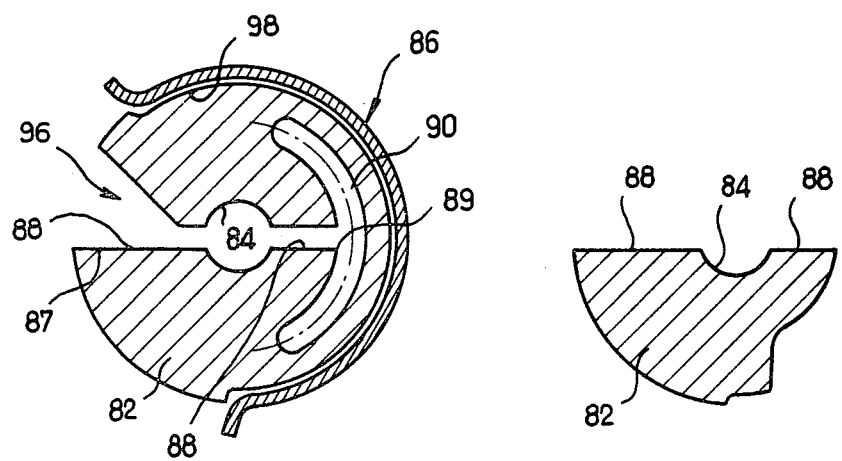
FIG_4  FIG_5

MECHANICAL CONTROL BY CABLE SLIDING AXIALLY IN A FLEXIBLE SHEATH

The present invention relates to mechanical control by cable sliding axially in a flexible sheath provided with an automatic adjustment device.

The invention relates more particularly to mechanical controls by cable applied to the control of a friction clutch for an automobile vehicle or the control of a drum or disc brake for an automobile vehicle. When such a type of control is used notably in the case of a friction clutch, wear of the friction linings of the clutch resulting from successive engagements and disengagements of the clutch induces the appearance of increasing clearances between the various elements of the clutch. If no device for compensating the clearances is provided, the rest position of the clutch actuating pedal varies gradually until it reaches a final position corresponding to maximum wear of the friction linings, in which the pedal is raised by several centimetres relative to its initial rest position corresponding to new friction linings. It is likewise ascertained, after installation of such a control on a vehicle and after a short time of use, that the cable tends to lengthen under the effect of the traction forces applied to it, the sheath tending for its parts to shorten under the effect of the compression forces applied to it in reaction. This lengthening of the cable and this shortening of the sheath are added to each other and induce likewise the appearance of parasitic clearances in the control which are harmful to correct functioning of this control. European patent application No. 0 030 494 A1 published on June 17, 1981 presents and describes a mechanical control by cable, provided with a device for automatic compensation of clearances mounted at one of the ends of the sheath. This device comprises a disengageable connecting system with wedging by balls, disposed between one end of the sheath and a fixed support attached to the chassis of the vehicle. The device proposed effects in a very satisfactory manner automatic compensation of any clearances capable of appearing in the control, but presents the disadvantage of having to be installed on a fixed part of the vehicle, this fixed reference being necessary to control unlocking of the disengageable connection with wedging by balls, when the pedal is in its normal rest position.

The object of the present invention is to provide a mechanical control by cable provided with an automatic adjustment device capable of compensating any clearances appearing in the control, and allowing it to abolish a fixed reference to the vehicle frame on which it is installed.

With this object, the invention proposes a mechanical control by cable sliding axially in a flexible sheath equipped with an automatic adjustment device for varying the length of the sheath as a function of the clearances appearing in the control, and of which one end is connected to a receiving member provided with elastic return means, said adjustment device including two telescopic sheath extensions inserted between two consecutive portions of the sheath to which they are fixed, characterized in that said device comprises a wedge-action locking member disposed between the two sheath extensions for interlocking the latter by wedging during actuation of the mechanical control, and a control member fixed to the locking member and connected to the cable by means of a friction connection, said control member being driven during actuation of the control in axial translation by the cable in the direction corresponding to wedging of the locking member until the sheath extensions are interlocked, said control member being driven in axial translation by the cable in the direction corresponding to unlocking when the return force applied to the sliding cable becomes less than a predetermined value.

The invention will now be described referring to the attached drawings in which:

FIG. 1 shows a mechanical control by cable provided with an automatic adjustment device according to the invention, applied to the control of a friction clutch of an automobile vehicle;

FIG. 2 is a view in axial section of the automatic adjustment device effected according to the present invention;

FIG. 3 is a detailed view of the locking member of the automatic adjustment device shown in FIG. 2;

FIG. 4 is a sectional view of the locking member along line 4—4 of FIG. 3; and

FIG. 5 is a sectional view along line 5—5 of FIG. 3.

The mechanical control shown in FIG. 1 comprises a cable 10 mounted in axial sliding relationship in a flexible cylindrical sheath of the "Bowden" type 12 of which the ends 14 and 16 are anchored to a fixed frame 18 formed for example by the chassis of an automobile vehicle. The first end 20 of the cable 10 is fixed to an actuating member 22 formed in the example shown by a pedal 22 mounted pivotally relative to the frame 18. The pedal 22 is returned to its rest position bearing on a fixed stop 24 by a pedal return spring 26. The second end 28 of the cable 10 is fixed to a receiving member formed in the example shown by a friction clutch control fork 30. The fork 30 is mounted pivotally relative to the frame 18 and is connected to a clutch disc 32. The clutch disc 32 is normally maintained in contact with a clutch plate 34 by clutch springs 36 supported on the frame 18. The disc 32 and plate 34 are both provided witch friction linings 35.

The mechanical control shown in FIG. 1 comprises further an automatic adjustment device 40 inserted between two consecutive portions 41 and 42 of the flexible sheath 12.

When the driver actuates the pedal 22 and causes the latter to pivot, he induces axial displacement of the cable 10 relative to the sheath 12 in the direction indicated by the arrow A; axial displacement of the cable 10 induces pivoting of the clutch fork 30 which entrains with it the clutch disc 32 at a distance from the plate 34, while compressing the clutch springs 36, to induce disengagement.

The automatic adjustment device 40 will now be described in more detail referring to FIG. 2 to 5. The device 40 includes two sheath extensions 43 and 44 fixed to the ends of the two consecutive sheath portions 41 and 42, respectively. The sheath extension 43 is received telescopically in the extension 44 to constitute a variable length device allowing the length of the sheath 12 to be adjusted automatically as a function of the clearances capable of appearing in the control. The sheath extension 43 is formed by a piece of tubular shape, which is fixed by its end 46 to the end of the sheath portion 41 and is mounted coaxially wit the latter. The extension 44 is likewise formed by a piece of tubular shape fixed to the second sheath portion 42 in an identical manner. The cable 10 can slide freely in the internal bores 45 and 46 of the sheath extensions 43 and 44. The sheath extension 43 is provided with a protective collar 48 made of material with the extension 43 and coaxial with the latter. The end 50 of the protective collar 48 is provided with an annular shoulder in the shape of a hook 51 capable of cooperating with a similar shoulder 52 provided at the end 53 of the sheath extension 44 to define a device for closing the casing formed by the two sheath extensions 43 and 44; the shoulders 51 and 52 further have the function of limiting relative axial displacement of the extensions 43 and 44 in a manner which will be described below. The automatic adjustment device 40 likewise includes an adjuster spring 54. The adjuster spring 54 is formed in the example shown by a helical compression spring disposed between the extension 43 and the extension 44. The end 55 of the spring 54 is supported on the inner wall 56 of the extension 43. The second end 57 of the helical spring 54 is supported on a washer 58 mounted in a radial groove 59 formed in the internal bore of large diameter 60 formed in the sheath extension 44. The compression spring 54 arranged thus urges the sheath extensions 43 and 44 apart from each other in the direction corresponding to a lengthening of the sheath 12. The adjustment device 40 further comprises a locking member 62 provided to interlock the extensions 43 and 44 during actuation of the mechanical control. The locking member 62 is provided with a releasable coupling device 64 with wedging by balls 74. This system includes a cylindrical sleeve 66 mounted in axial sliding relationship in the large diameter internal bore 60 of the sheath extension 44. A frustoconical bearing surface 67 is formed in the internal bore 60 of the extension 44. The outer cylindrical surface 68 of the sheath extension of tubular shape 43 is received in sliding relationship in an internal bore 70 formed in the cylindrical sleeve 66. The cylindrical outer surface 68 defines a cylindrical bearing surface which cooperates with the frustoconical bearing surface 67 to form between them a recess 72 in which are received balls 74. The balls 74 are distributed circularly and are disposed in radial bores 76 formed in the sleeve 66; the sleeve 66 constituting a cage for the balls 74 which are mounted freely in the bores 76.

The locking member 62 is controlled by a control member, shown schematically in FIG. 2 and designated by the general reference 80. The control member 80 is formed by a split spring collet 82 in which is formed a cylindrical internal bore 84 in which the cable 10 is received in sliding motion, the bore 84 cooperating with the outer cylindrical surface 11 of the cable 10. In the example shown, the spring collet 84 is made of material with the locking member 62 which is made in a flexible material. The split spring collet 84 is compressed and maintained clamped on the cable 10 by means of an element forming a spring 86. It can be understood that in this way the control member 82 is connected to the cable 10 by a friction connection resulting from contact between the inner wall of the bore 84 and the outer surface 11 of the cable 10.

The control member 80 will now be described in more detail referring to FIGS. 3 to 5. FIG. 3 to 5 show the end portion of the locking member 62 constituting the control member 80. The locking member 80 is shown independently of the other elements of the control and notably of the cable 10. The member 80 includes a split spring collet 82 comprising a body of cylindrical general shape. In order to possess good elasticity, the cylindrical body 82 is split in the following manner: it comprises a first transverse axial slot 88 extending approximately along a diameter of the body 82 and ending at its first end 89 in a slot in the form of a circular crown 90 extending over about one-third of the circumference, and extending axially from the end 92 of the cylindrical body 82 as far as a radial transverse slot 94 extending over about half the cylindrical block 82. The slot 88 widens in the proximity of its second end 87 to form a recess in the form of a circle sector 96 extending transversely over a length identical with the slot in the form of a crown 90. The control member 80 finally comprises a spring 86 formed by a circlip made of sheet metal and exhibiting approximately the shape of an incomplete ring. The spring 86 is mounted in an external radial groove 98 in the resilient block 82. The spring 86 is mounted tightly on the groove 98 to apply to the block 82 a resilient stress inducing wedging of the cable 10 in the internal bore 84 of the block 82. In the embodiment shown, the whole of the locking member 62 including particularly the control member 80 is made of thermoplastic material known under the name of "Delrin" and cooperates with the outer surface 11 of the cable 10 which is generally formed by a wrapping made of polyethylene or polyamide.

Operation of the automatic adjustment device mounted on the mechanical control will now be described. When the driver actuates the control, for example by acting on the pedal 22, he induces axial displacement of the cable 10 relative to the sheath 12; during this displacement, the cable entrains by friction the control member 80 which is fixed rigidly to the locking member 62. It can be understood that in this way, as soon as the driver acts on the cable 10, the locking member 62 moves to the right, considering FIG. 2, and induces wedging of the balls 74 between the bearing surfaces 67 and 68 which then occupy the position shown in FIG. 2. As soon as the balls 74 are wedged between the bearing surfaces, the locking member interlocks the sheath extensions 43 and 44 to constitute a sheath of constant length behaving like a conventional cable sheath. Any force applied to the cable 10 is applied by reaction to the sheath 12 and hence consequently to the sheath extensions 43 and 44 which are subjected to forces acting in the direction corresponding to shortening of the sheath. These forces amplify wedging of the balls 74 between the two sheath extensions, and stop the two extensions in their relative axial position as well as the locking member 62 relative to the two extensions. From this moment on, any supplementary displacement of the cable 10 to the right induces sliding of the cable relative to the member 80, that is the control member 80 is no longer entrained by friction, the wedging forces exerted on the balls being greater than the friction force exerted by the cable 10 on the control member 80. The driver can therefore control disengagement of the clutch 30 with all reliability, the mechanical control behaving like a mechanical control of a conventional type in which the sheath is continuous. When the driver releases the force applied to the pedal 22, the cable is subjected by the return springs of the clutch 30 to a return force inducing its axial displacement to the left. The force applied to the cable 10 by the return springs 36 is likewise transmitted by reaction to the sheath in two parts and consequently to the sheath extensions 43 and 44. In an identical manner with what has been described above, these reaction forces transmitted to the extensions 43 and 44 amplify wedging of the balls 74 between the two extensions and stop these two elements relative to each other as well as the locking member 62 relative to the two extensions. During the return stage of the cable, the latter slides relative to the control member 80 of the locking member 62. This sliding continues until the clutch approaches the engaged position. During this approach, the return force applied to the cable, and by reaction to the sheath, decreases progressively until the clutch is in the engaged position, in which the forces applied to the sheath and to the cable are zero. It will be understood that during its decrease, the force applied to the cable passes through a predetermined value corresponding to the boundary force of sliding of the cable 10 relative to the control member 80; below this predetermined value, the cable can again entrain the control member by friction and consequently induce displacement of the locking member 61 to the left. Displacement of the locking member 62 to the left induces unwedging of the balls 74 and unlocking of the sheath extensions, the wedging force applied to the balls having decreased progressively as the return force applied to the cable decreased. Displacement of the locking member to the left is limited by the washer 58 against which the free end 65 of the cylindrical sleeve 66 comes to bear. The path of the locking member 62 relative to the extension 44 is also limited to a value "1" necessary for unlocking of the member 62. In the rest position of the control, the two extensions 43 and 44 can slide freely relative to each other telescopically to allow, notably by the action of the helical spring 54, automatic adjustment of the length of the sheath 10, that is, automatic compensation of any clearances capable of appearing in the control. It can be understood that in this way the mechanical control provided with the automatic adjustment device 40 constitutes a "self-adjusting" cable capable of compensating any clearances appearing in the mechanical control and capable of being installed on any vehicle at all in place of a conventional control cable, and this without any adaptation either of the vehicle or of the conventional cable fixing means such as stops or cable ferrules. This advantage is preponderant particularly for the installation of cables on modern vehicles in which the constraints of bulkiness are among the most important. It can further be understood that mounting of such a self-adjusting cable ensures all reliability as regards correct functioning of the receiving member which is associated therewith, this being from mounting of the cable on the vehicle onwards, no further adjustment nor any adaptation being necessary. Particularly, the rest position of the actuating member formed by a pedal is ensured constantly in the course of time. The automatic adjustment device proposed further allows it to be adapted for any cable length at all, the manufacturer of the latter having only to modify the length of the two sheath portions between which the device is inserted to adapt to the demand of different users. The mechanical control provided with its adjustment device being moreover of the type in which the cable is not interrupted, it exhibits all the conditions of reliability and safety desirable notably in case of a possible defect in the adjustment device. In fact, in case of poor functioning, for example of the device with wedging by balls, the driver will nevertheless be able to actuate the clutch control, the two sheath extensions 43 and 44 then abutting one inside the other, that is, the end 52 of the extension 44 coming to bear on the inner wall 56 of the extension 43 to form again a sheath of constant length, poor functioning of the adjustment device then being capable of being detected by the driver who will ascertain significant idle travel of his pedal before disengagement. The structure of the extension 43 provided with the collar 48 cooperating with the extension 44 defines a casing of which the tightness is ensured by cooperation of the shoulders 51 and 52 which define a baffle to prevent entry of impurities into the system. The shoulders 51 and 52 likewise allow assembly of the adjustment device properly speaking to be ensured by simple resilient nesting of the extension 44 in the extenstion 43 to avoid inopportune opening of the adjustment device during installation of the cable on a vehicle.

The invention is not limited to the embodiment which has just been described. Numerous variants are possible, particularly as far as concerns the different materials used for the control member 80 and the cable wrapping 11 so as to ensure a correct coefficient of friction between these two elements. The control member may be replaced by a collet of the type similar to the mandrels of tools gripping the cable until a predetermined value of force applied to the cable opens this collet. In the same way, the locking member 62 may be of a different type but always acting by wedging to interlock the two pieces 43 and 44, the wedging force always having to be proportional to the forces applied to the cable and by reaction to the sheath.

In another embodiment, not shown, the adjuster spring is disposed at the outside of the adjusting device. In this embodiment, the spring 54 is disposed concentrically with the sheath portion 41 and outside thereof. One end of the spring 54 is supported on a shoulder fixed to the sheath portion 41 and the other end is supported on a radially extending shoulder formed on the sheath extension 44. This second embodiment allows to reducing the overall length of the adjusting device and to mounting a longer spring.

I claim:

1. Mechanical control for a cable sliding axially in a flexible sheath, equipped with an automatic adjustment device for varying the length of the sheath in response to clearances appearing in the control, one end of the cable being connected to a receiving member provided with elastic return means to impart a return force to the cable, said adjustment device including two telescopic sheath extensions inserted between two consecutive portions of the sheath to which they are fixed, said adjustment device comprising a wedge-action locking member disposed between the two telescopic sheath extensions to interlock the latter by wedging during actuation of the mechanical control, characterized in that said mechanical control comprises a control member fixed to the locking member and connected to the cable by means of a friction connection, said control member being movable directly by the cable in the direction corresponding to wedging of the locking member in order to actuate the locking member and interlock the two telescopic sheath extensions, said control member being movable directly by the cable in the direction corresponding to unlocking when the return force applied to the cable becomes less than a predetermined value and the two telescopic sheath extensions are unlocked.

2. Mechanical control according to claim 1, characterized in that said sheath extensions are formed by two pieces of tubular shape received telescopically one inside the other and between which is received said wedge-action locking member.

3. Mechanical control according to claim 2, characterized in that said locking member includes a cylindrical sleeve coaxial with said sheath extensions, balls mounted freely in radial bores formed in the sleeve to cooperate with bearing surfaces provided on said sheath extensions during actuation of the mechanical control.

4. Mechanical control according to claim 3, characterized in that said bearing surfaces include a cylindrical bearing surface formed on one of said sheath extensions and a conical bearing surface formed on the other of said extensions opposite the cylindrical bearing surface, said surfaces cooperating with each other to define a recess in which are received said balls.

5. Mechanical control according to any of claims 1 to 4, characterized in that said control-member is formed by a spring collet including a body made of flexible material provided with a bore in which the cable is received in sliding motion, and a spring compressing said body so as to maintain the inner wall of the bore in contact with the outer surface of the cable and thus define said friction connection.

6. Mechanical control according to claim 1, characterized in that said adjustment device includes an adjuster spring disposed between the two consecutive portions to urge the latter apart from each other, that is, in the direction corresponding to lengthening of the sheath.

7. A cable mechanical control including a continuous cable length slidingly extending in a flexible sheath means and an automatic adjustment device for varying the overall length of said sheath for taking-up play appearing in said control, said cable having one end connectable to a receiving member to be actuated provided with resilient return means, and its other end connectable to an actuating member for actuation of said cable in the direction opposite said return means, said sheath means comprising consecutive separate flexible sheath portions each prolongated by a tubular extension member intermediate the length of said cable, a releasable coupling device interposed between and cooperating selectively with said extension members for mutually coupling said extensions members during actuation of said control, and a, control member coupling directly said releasable coupling device to said cable for displacement in unison in both directions when no resisting force exceeding a determined value is opposed to displacement of said control member relative to said cable.

8. A mechanical control according to claim 7, wherein said control member frictionally engages said cable and is connected to said coupling device.

9. A cable mechanical control including a continuous cable length extending in a flexible sheath having consecutive separate flexible sheath portions each prolongated by a tubular extension member, each of said extension members being mutually telescopically arranged, a normally released releasable coupling device interposed between and cooperating selectively with said extension members, and a control member connected to said coupling device and frictionally engaging said cable to be driven therewith so as to actuate said coupling device for interlocking said extension members when said control is actuated.

10. Mechanical control according to clam 9, characterized in that said sheath extension members are formed by two rigid pieces of tubular shape received telescopically one inside the other and between which is received said releasable coupling device.

11. Mechanical control according to claim 10, characterized in that said releasable coupling device includes a cylindrical sleeve coaxial with said tubular extension members, balls mounted freely in radial bores formed in the sleeve to cooperate with complementary cam bearing surfaces provided on said sheath extensions during actuation of the mechanical control.

12. Mechanical control according to claim 11, characterized in that said cam bearing surfaces include a cylindrical bearing surface (68) formed on one of said sheath extension members and a conical bearing surface formed on the other of said extension members opposite the cylindrical bearing surface, said surfaces defining a recess in which are received said balls.

13. Mechanical control according to claim 9, characterized in that said control member is formed by a resilient collet including a body made of flexible material provided with a bore in which the cable is received in sliding motion, and a spring compressing said body so as to maintain the inner wall of the bore in friction contact with the outer surface of the cable.

14. Mechanical control according to claim 9 further including an adjuster spring (54) disposed between the two consecutive sheath portions to urge the latter apart from each other, that is, in the direction corresponding to lengthening of the sheath.

* * * * *